Dec. 23, 1958    R. A. LOLLEY ET AL    2,865,103
SHAFT ROTATION DETERMINING APPARATUS
Filed Feb. 9, 1956    2 Sheets-Sheet 1
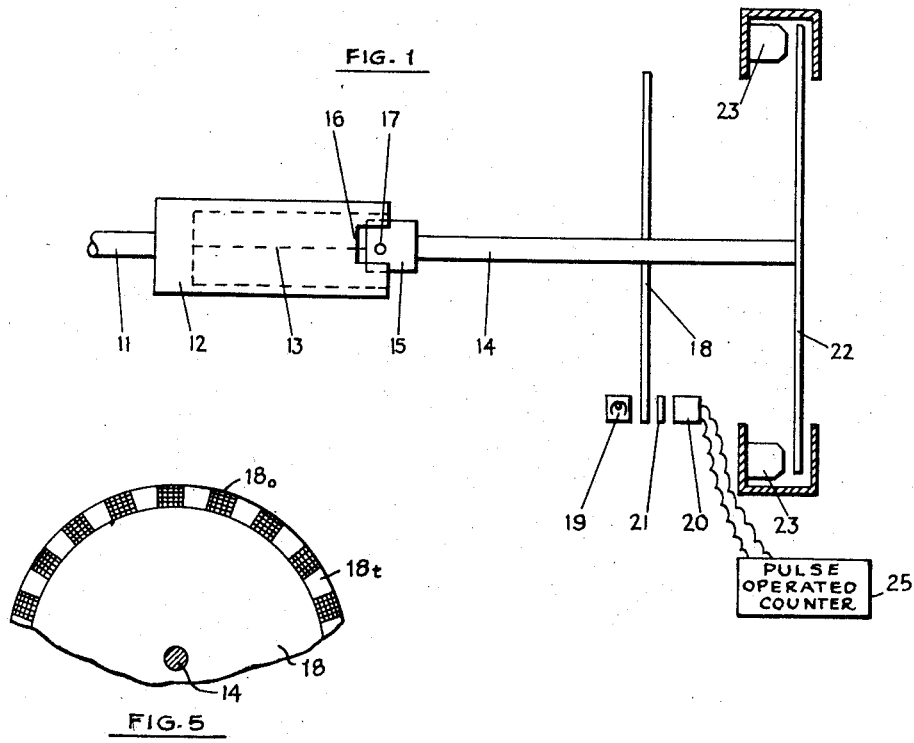
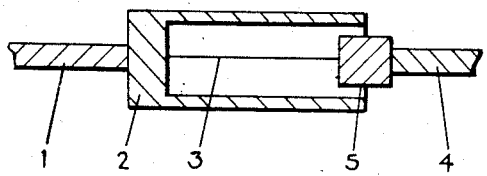
FIG. 2
INVENTORS
Raymond Alan Lolley
John Gibson Padbury
BY Cushman, Darby + Cushman
ATTORNEYS Dec. 23, 1958     R. A. LOLLEY ET AL     2,865,103
SHAFT ROTATION DETERMINING APPARATUS
Filed Feb. 9, 1956     2 Sheets-Sheet 2

INVENTORS
Raymond Alan Lolley
John Gibson Padbury

BY Cushman, Darby & Cushman
ATTORNEYS

United States Patent Office 2,865,103
Patented Dec. 23, 1958

2,865,103

SHAFT ROTATION DETERMINING APPARATUS

Raymond Alan Lolley, St. Albans, and John Gibson Padbury, Welwyn Garden City, England, assignors to Imperial Chemical Industries Limited, London, England, a corporation of Great Britain Application February 9, 1956, Serial No. 564,608

Claims priority, application Great Britain February 17, 1955

10 Claims. (Cl. 33—1)

This invention relates to shaft rotation determining apparatus.

It has been proposed to measure the rotation of a shaft by attaching to the shaft a disc having radial markings that are arranged to interrupt the passage of a beam of light on to a photoelectric cell as the shaft rotates, thereby causing electric pulses to be generated in the photoelectric cell, which are counted by an electric or electronic counter.

Where the pulses are counted by a non-directional counter, it is important that the shaft should not oscillate, or when coming to rest at a particular point, should not overshoot that point and return, since the total movement of the shaft, irrespective of direction of movement will be indicated or recorded by the counter. This is particularly important in, for example, a weighing machine, where the movement of the shaft to be measured is normally in one direction, but where the pointer may hunt, or overshoot the point at which it finally comes to rest. Hunting and overshooting may be eliminated by known methods of damping but this may result in an undesirable slowing up of the speed of operating the weighing machine, or measuring the rotation of the shaft.

An object of the present invention is to provide apparatus for determining the rotation of a shaft such that oscillations in the shaft are not transmitted to the position determining device.

According to the present invention we provide apparatus comprising a rotatable means, an elastic coupling means for coupling said rotatable means to the shaft whose rotation it is desired to determine, the coupling means producing a torque tending to restore said rotatable means to a neutral position relative to the shaft when there is an angular displacement from the neutral position between the shaft and the rotatable means, and damping means controlling the movement of the rotatable means. We prefer that when the shaft is at rest and our rotatable means is in the neutral position, the torque produced by the damping means should be zero, or very close to zero.

In order that our invention may be more fully understood three embodiments will be described by reference to the attached drawings.

Figure 1 illustrates in diagrammatic form a side view of one form of the apparatus, and Figure 2 illustraates a vertical section through the arrangement shown in Figure 1.

Figure 5 is a side elevational view of the disc utilized to interrupt the light beam.

Figure 3:
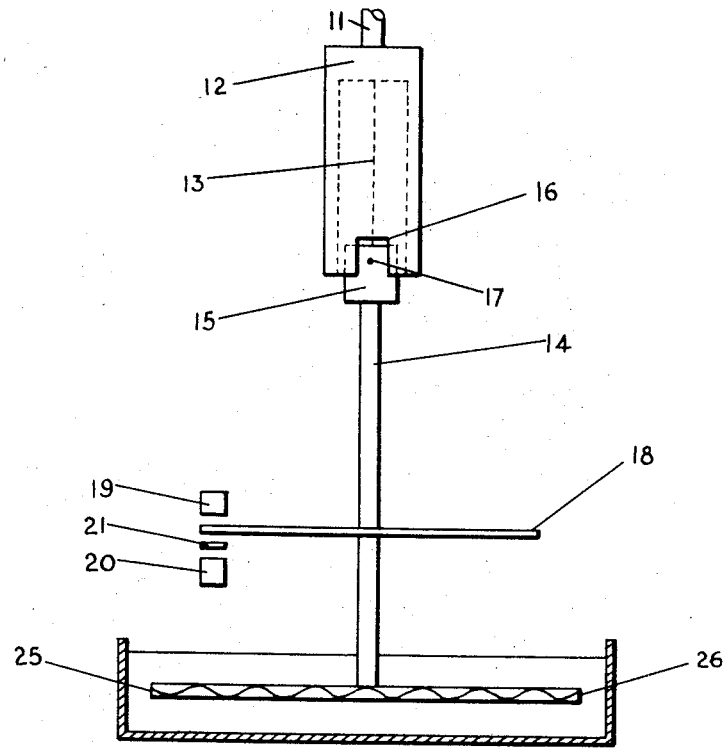
Figures 3 and 4 illustrate side views of alternate forms of the apparatus in which liquid damping is used.

The shaft whose movement it is desired to measure is shown at 11; it has fixed to one end a light alloy sleeve 12, which has two diametrically opposed recesses cut into its open end, one of which is shown at 16. Both shafts 11 and 14 are mounted coaxially; shaft 14 is mounted on light ball race bearings, which for the sake of simplicity are not illustrated. The shaft 14 has the collar 15 fixed to one end, and the two shafts are connected as shown by the 2 inch length of 0.0136" diameter copper beryllium alloy wire 13. The collar 15 carries a pin 17 which protrudes through each of the recesses in the end of the sleeve 12.

The shaft 14 has fixedly mounted on it the disc 18 which is of light weight and has uniformly spaced alternate opaque and transparent radial portions 18o and 18t, respectively. A light source 19 is mounted on one side of the disc and the beam of light is directed through the transparent portions of the disc 18 on to the grid 21 that is marked in a similar way to the disc and thence to the photoelectric cell 20. Rotation of disc 18 causes interruption of the beam of light on to the photoelectric cell and thus produces pulses in accordance with movement of the shaft 14, which are fed to a counter 25 which may, for example, be a relay operated type counter, or a hard valve counter, or a polycathode gas-filled tube type counter.

The shaft 14 also has fixedly mounted on it the aluminium disc 22. The periphery of the disc 22 moves between the pole pieces of four equally spaced permanent magnets, two of which are shown at 23. The purpose of the magnets is to provide eddy current damping of the disc 22.

When shaft 11 rotates, by virtue of the damping effect of the magnets on the disc 22, and the elasticity of the wire 13, the shaft 14 lags slightly. To prevent undue stress on the wire 13 and to ensure that the lag between the two shafts does not become too great, a rigid coupling between the shafts 11 and 14 is provided which automatically comes into operation when the lag between the two shafts reaches a pre-determined amount. This is effected by the recesses 16 in the sleeve 12, and pin 17 which form inter-engageable parts and which operate by one part bearing against the other part when the lag between the two shafts reaches the pre-determined amount. The width of the recess (i. e. measured circumferentially) is equivalent to 10° of arc; consequently when the lag between the two shafts is 5° less half the width of the pin, the rigid coupling is effected and no additional stress is placed upon the wire 13.

In operation when shaft 11 rotates in one direction, the movement is transmitted through wire 13 to the shaft 14, but the damping effect of the magnets 23 causes the shaft 14 to lag behind shaft 11. When shaft 11 stops, the elasticity of the wire 13 causes the shaft 14 to be brought into the neutral position with respect to shaft 11. If shaft 11 overshoots the point at which it should stop and then returns and comes to rest at that point, the lag can be sufficiently great so that the overshoot is not transmitted to shaft 14, but the shaft 11 is allowed to overshoot and return to the point of rest before shaft 14 moves into coincidence with shaft 11. Likewise, if shaft 11 oscillates continually about a point, the elasticity of wire 13 and the damping of disc 22 can allow the shaft 14 to remain at rest.

It will be appreciated that this invention is not limited to apparatus in which oscillations of large amplitude only are prevented from being transmitted to the position determining device, e. g. those that may occur as a result of hunting of the shaft whose rotation it is desired to determine. Thus, apparatus of this invention can advantageously be used in conjunction with equipment that can follow the movement of a shaft in either direction but which is sensitive to and adversely affected by pulses if generated by mere vibration of the shaft, such as may be transmitted for example through the floor on which the equipment stands. By the use of the apparatus of this invention such equipment can be used to follow the position of a shaft even when the shaft is subjected to vibrations.

The nature of the elastic coupling and the amount of damping to be used in our invention will depend upon the behaviour of the shaft whose movement it is desired to measure and the extent to which oscillations can be tolerated in said rotating member; e. g. its maximum speed, amount of overshoot, and ampliutde and frequency of oscillation that the apparatus is required to damp. For example, we have found by incorporating our apparatus in a conventional automatic weighing machine capable of weighing up to 500 lb., and using a copper-beryllium alloy wire of 0.0164 inch diameter and 1⅜ inches long as the elastic coupling in conjunction with a rotatable means comprising a shaft carrying a damped disc and a graduated disc for generating electric pulses, the rotatable means having a moment of inertia of 1900 grams/cm.$^2$, that while movements of the pointer in response to changes in weight on the platform were transmitted to the disc, no oscillations of the weighing machine pointer were transmitted to the disc. It was thus possible to record accurately the weights measured out on a pulse operated counter. It is desirable that the bearings on which the rotatable means is mounted, should offer the least possible resistance to the movement of the rotatable means.

Where a rigid coupling is also provided, as hereinbefore described, the amount of lag that may occur before the coupling comes into effect will be determined by the amount of overshoot or the amplitude of oscillation of the shaft which it is intended that our equipment should control. Where the rigid coupling is of the kind hereinbefore described, the width of the recess cut into the sleeve can be made adjustable so that changes in working conditions may be allowed for. It will be appreciated that the apparatus need not comprise a rigid coupling but we prefer to have such a coupling for the reasons already given.

The elastic coupling can be in any convenient form and of any convenient material. For example it can be of spring steel, or an alloy e. g. copper beryllium alloy, or phosphor bronze and it can be in the form of a wire or strip, straight or in the form of spiral or helical springs. Rubber tube can also be used although we prefer to use materials that are stable and do not manifest the phenomena of hysteresis and creep.

The damping need not be of the eddy current type although this is a convenient method to use. Electromagnets can be used in place of permanent magnets, particularly where it may be desired to change the amount of damping during rotation of the shaft. The rotatable means can also be damped by causing some part of the means to move through or in a bath of liquid, the part offering some resistance to movement through the liquid. For example, the means can carry a disc of an inert material, arranged, if necessary, by means of a flexible coupling, to lie in a horizontal plane completely immersed in a liquid. Where the damping effect is obtained by means of a liquid it is important that the material of the disc should be inert to the liquid, and that the liquid should be preferably substantially non-volatile. An arrangement of this type is illustrated in Figure 3, which is a modification of the arrangement illustrated in Figure 1. The shaft 14 carries at its end the disc 25 which lies in a horizontal plane in the liquid 26 which may be, for example, oil; the disc 25 is made of, for example, aluminium and has radial corrugations. Alternatively the disc can be substantially planar but have small radial paddles or vanes.

Figure 4:
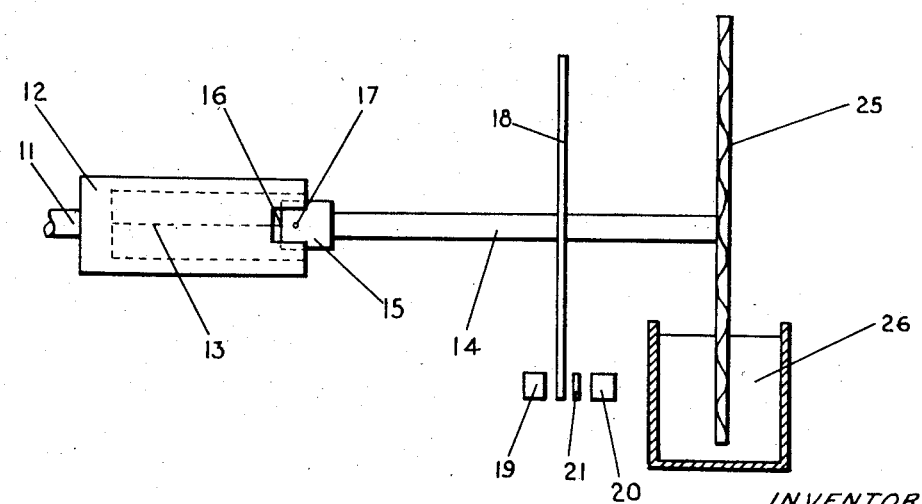

The arrangement can alternatively comprise a vertical disc that is only partly immersed in a liquid, and in such an arrangement it is desirable that the liquid should not wet the disc, and that surface tension effects should be as small as possible. This arrangement is shown in Figure 4 which is an alternative form of that shown in Figure 3. The disc 25 is in the vertical position, and only part of the disc is immersed in the liquid.

An advantage of our invention is that because the moment of inertia of said rotating member need never be high, a degree of damping that might interfere unduly with the free movement of the shaft whose movement it is desired to measure is not necessary.

Where the rotation of the shaft is measured by an electric pulse counting apparatus, the pulses can be generated by means other than those hereinbefore described. For example pulses can be generated by causing the current induced in a circuit, or a capacity to be varied as the shaft rotates. For example the rotatable means can carry a disc that moves near a stationry disc, both discs being suitably marked with electric circuits, so that movement of one disc causes changes in induced current or in capacity. Our rotatable means can, if desired, carry a visual weight indicating means; this would enable an operator to observe visually changes in the position of the shaft.

Our equipment has many important applications, in particular in weighing machines. For rapid operation in automatic weighing machines it is normally desirable that there should be a slight overshoot before the pointer comes to rest, and there may also be oscillation of the pointer from other causes. Where it is desired in such weighing machines, to measure weights or measure out weights by means of electric pulse operated counters, as for example described in British Patent 771,052, dated March 27, 1957, the use of our equipment makes this possible without affecting the normal working of the weighing machine. Furthermore, when it is necessary to determine that a shaft is stationary except for vibrations, which may be caused by its location, our equipment may be used to prevent the transmission of these vibrations to the device to determine that the shaft is stationary.

We claim:

1. Apparatus for measuring the amount of angular movement of a shaft comprising a rotatable means mounted coaxially with said shaft, a coaxial thin metal wire elastically coupling said rotatable means to said shaft, said wire producing a torque tending to restore said rotatable means to a neutral relative position between said shaft and said rotatable means when there is angular displacement from said neutral relative position, damping means controlling the movement of said rotatable means whereby said rotatable means is displaced from neutral relative position when there is movement of said shaft, and means to measure the total angular movement of said rotatable means.

2. Apparatus according to claim 1, wherein said means to measure the angular movement of said rotatable means includes a device for generating electric pulses in accordance with said angular movement, and a pulse operated counter for receiving said pulses.

3. Apparatus according to claim 2, wherein said device for generating electric pulses includes a member movable with said rotatable means and having uniformly spaced alternate opaque and transparent portions, and a source of light and a photosensitive element operatively associated with said member in such manner that said opaque portions interrupt the passage of light from said source to said photosensitive element when there is movement of said rotatable means.

4. Apparatus according to claim 1, wherein said damping means is of the eddy current type.

5. Apparatus according to claim 1, wherein said damping means includes a body of liquid in which some part of said rotatable means is immersed.

6. Apparatus according to claim 1, wherein said wire is a copper beryllium alloy.

7. Apparatus according to claim 1, wherein said wire is a phosphor bronze alloy.

8. Apparatus according to claim 1, wherein said wire is composed of spring steel.

9. Apparatus according to claim 1, including rigid means limiting the relative angular displacement between said shaft and said rotatable means.

10. Apparatus according to claim 1, including a rigid coupling between said shaft and said rotatable means limiting the relative angular displacement therebetween, said rigid coupling comprising a cylindrical sleeve attached to one of the associated shaft and rotatable means members, said sleeve having diametrically opposed recesses in its open end, and a pin interengageable with both of said recesses attached to the other of the associated members.

References Cited in the file of this patent

UNITED STATES PATENTS

| | | |
|---|---|---|
| 1,507,921 | Karge et al. | Sept. 9, 1924 |
| 1,684,229 | Koenigsberger | Sept. 11, 1928 |
| 1,968,859 | Smith | Aug. 7, 1934 |
| 1,977,027 | Vaughan | Oct. 16, 1934 |
| 2,519,378 | Kilpatrick | Aug. 22, 1950 |
| 2,681,574 | Jack et al. | June 22, 1954 |
| 2,724,183 | Edison | Nov. 22, 1955 |
| 2,734,188 | Jacobs | Feb. 7, 1956 |